US012729881B2

(12) United States Patent
Jacobs et al.

(10) Patent No.: US 12,729,881 B2
(45) Date of Patent: Sep. 8, 2026

(54) BEARING ASSEMBLY FOR A SOLAR MOUNTING SYSTEM

(71) Applicant: KLOECKNER METALS CORPORATION, Roswell, GA (US)

(72) Inventors: Jeremy Jacobs, Sacramento, CA (US); Michael Starr, Mountain View, CA (US); Jordan Mast, Placerville, CA (US); Mark Schroeder, Rancho Cordova, CA (US)

(73) Assignee: Sol Components LLC, Wilmington, DE (US)

( * ) Notice: Subject to any disclaimer, the term of this patent is extended or adjusted under 35 U.S.C. 154(b) by 89 days.

(21) Appl. No.: 18/957,289

(22) Filed: Nov. 22, 2024

(65) Prior Publication Data

US 2025/0164155 A1 May 22, 2025

Related U.S. Application Data

(60) Provisional application No. 63/601,747, filed on Nov. 22, 2023.

(51) Int. Cl.

| | |
|---|---|
| ***H02S 20/10*** | (2014.01) |
| ***F24S 30/425*** | (2018.01) |
| ***H02S 20/32*** | (2014.01) |
| *F24S 30/00* | (2018.01) |

(52) U.S. Cl.
CPC ............ *F24S 30/425* (2018.05); *H02S 20/32* (2014.12); *F24S 2030/15* (2018.05)

(58) Field of Classification Search
CPC ..... F24S 30/425; F24S 2030/15; H02S 20/32; Y02E 10/47
See application file for complete search history.

(56) References Cited

U.S. PATENT DOCUMENTS

| | | | | |
|---|---|---|---|---|
| 8,939,648 | B2 | 1/2015 | Schneider | |
| 9,482,449 | B2 * | 11/2016 | Cole | F24S 30/425 |
| 10,097,134 | B2 | 10/2018 | Molina et al. | |
| 10,944,354 | B2 | 3/2021 | Ballentine et al. | |
| 11,863,118 | B2 | 1/2024 | Dally | |
| 11,976,687 | B2 * | 5/2024 | Sasidharan | H02S 20/10 |
| 12,535,101 | B2 * | 1/2026 | Quan | F16C 11/0695 |
| 2015/0107580 | A1 | 4/2015 | Weber et al. | |
| 2016/0218663 | A1 | 7/2016 | Werner | |
| 2017/0102168 | A1 | 4/2017 | Childress | |
| 2023/0279987 | A1 | 9/2023 | Dally | |
| 2024/0429852 | A1 * | 12/2024 | McPheeters | H02S 20/10 |

* cited by examiner

*Primary Examiner* — Amy J. Sterling
(74) *Attorney, Agent, or Firm* — Fitzpatrick PC

(57) ABSTRACT

A bearing for a solar mounting system, the bearing comprising a bushing assembly configured to accept a torque tube. It has a front bushing, a back bushing to accept a torque tube, a stop ring sandwiched between each of the front bushing and the back bushing, a bushing housing configured to retain the bushing assembly. A coupler extends through the bearing to connect the front and back bushings to the housing, wherein during rotation of the bushings, the stud of the stop ring is configured to mate with the coupler to halt a rotation of the front busing and the back bushing to thereby distribute a torsional force along the solar mounting system.

20 Claims, 9 Drawing Sheets

BEARING ASSEMBLY FOR A SOLAR MOUNTING SYSTEM

TECHNICAL FIELD

The present disclosure relates generally to mounting systems for solar panels. More specifically, the present application relates to a bearing assembly for a solar mounting system that tracks the movement of the sun by varying tilt angles throughout the day to increase the energy output because the solar panels receive the most possible exposure.

BACKGROUND

Renewable energy sources are increasingly seen as the solution to meeting growing energy demands while reducing greenhouse gas emissions and dependence on fossil fuels. Solar energy is a viable solution to meeting the ever-increasing demand for energy. The use of solar cells or photovoltaic cells is one method of harnessing the sun's energy. The solar cell is a device that converts light energy into electrical energy by the photovoltaic effect.

A solar tracker is a device that adjusts the direction of a solar panel according to the position of the sun in the sky. By keeping the panel perpendicular to the sun, more sunlight strikes the solar panel, less light is reflected, and as a result, more energy is absorbed. That energy can then be converted into power. It is understood that these devices change their orientation throughout the day in accordance with the position of the sun to maximize the overall efficiency of the energy captured. Since the sun's position in the sky changes with the seasons and the time of day, trackers are used to align the collection system to maximize energy production.

A typical solar tracker includes a solar panel assembly mounted to a support structure such as a post secured to the ground. The support structure includes actuators to tilt the angle of the solar panel with respect to the panel. A slew drive is positioned between the panel and the support structure to facilitate the rotation of the solar panel assembly, while the foundation piles support the weight of the assembly.

Generally, solar trackers read environmental conditions such as wind and snow via sensors located throughout a solar project site. When these sensors determine that certain conditions could cause damage to the tracker, such as increased wind speed beyond a programmed threshold, the solar tracker may re-orient itself to a "safety stow" position. This safety stow position is often at full tilt angle oriented with the modules facing into the wind. While high tilt angles actually increase wind loads on the structure, they provide stability to the system for safety purposes. However, the high tilt angle safety positions result in a large torsional force on the tracker torque tube. Furthermore, hail damage is a serious problem in the industry to the point that insurance companies are refusing to insurance structures in high risk ail zones. As such, to decrease hail damage, it would be advantageous for the panels to be as close to vertical as possible in the stow position. However, this presents a myriad of design issues.

Current bearing assemblies either do not provide an integrated torsional lock-out for safety stow position (and so do not alleviate torsion on the torque tube), or utilize torsional stops that require costly materials and are difficult to install due to the quantity of additional parts and associated hardware.

To this end, traditional tracker systems on the market consist of a single slew drive gearbox, usually located at the center of the tracker that is the primary "torsional lockout" in the tracker system. When the system is experiencing wind forces, only the slew drive and stiffness of the torque tube are resisting the torsion caused by the wind. This requires torque tube stiffness to be very high, which increases the cost of the system significantly.

In light of all the above-mentioned drawbacks, there is a need for a bearing assembly that obviates the above-recited drawbacks.

SUMMARY

The present disclosure describes embodiments of mounting systems for solar panels. More specifically, the present application relates to a bearing assembly for a solar mounting system that tracks the movement of the sun by varying tilt angles throughout the day to increase the energy output, varying the tilt angles in a way that the solar panels receive the most possible exposure.

In embodiments, the disclosure describes a bearing for a solar mounting system. The bearing comprises a bushing assembly configured to accept a torque tube, wherein the bushing comprises: front bushing; a back bushing, wherein each of the front bushing and the back bushing is configured to accept a torque tube; a stop ring sandwiched between each of the front bushing and the back bushing, wherein the stop ring comprises at least one a stud protruding therefrom; a bushing housing configured to retain the bushing assembly, wherein the bushing housing comprises at least one coupler configured to extend through at least a part of a length of the bearing to connect the front and back bushings to the housing, wherein during rotation of the bushings, the at least one stud of the stop ring is configured to mate with the coupler to halt a rotation of the front busing and the back bushing to thereby distribute a torsional force along the solar mounting system.

In embodiments, a method for controlling rotation of a toque tube for a solar mounting system is provided. providing a bushing assembly configured to accept a torque tube, wherein the bushing comprises a front bushing; a back bushing, wherein each of the front bushing and the back bushing is configured to accept a torque tube; a stop ring sandwiched between each of the front bushing and the back bushing, wherein the stop ring comprises at least one a stud protruding therefrom; a bushing housing configured to retain the bushing assembly, wherein the bushing housing comprises at least one coupler configured to extend through at least a part of a length of the bearing to connect the front and back bushings to the housing, during rotation of the bushings, stopping the rotation bushings using the stop ring stud to mate with the coupler to distribute a torsional force along the solar mounting system.

Advantages of the described bearing assembly include low cost, but high-strength pre-galvanized steel construction, integrated dual-stop torsional lockouts, and profile molded bushings to facilitate rapid installation to the torque tube. The bearing assembly also utilizes slotted hole patterns that allow for field installation adjustability in the vertical, horizontal, plum, and twist axes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF FIGURES

Aspects of the present disclosure are illustrated by way of example and are not limited by the accompanying figures for which like references indicate like elements.

DETAILED DESCRIPTION

Exemplary embodiments are discussed below with reference to the Figures.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The described embodiments are to be considered in all respects only as illustrative and not restrictive. The scope is, therefore, indicated by the appended claims rather than by the foregoing description. All changes that come within the meaning and range of equivalency of the claims are to be embraced within their scope.

While the present disclosure is described in relation to solar mounting system, the bearing assembly may be used in other industries as well.

Figure 1:
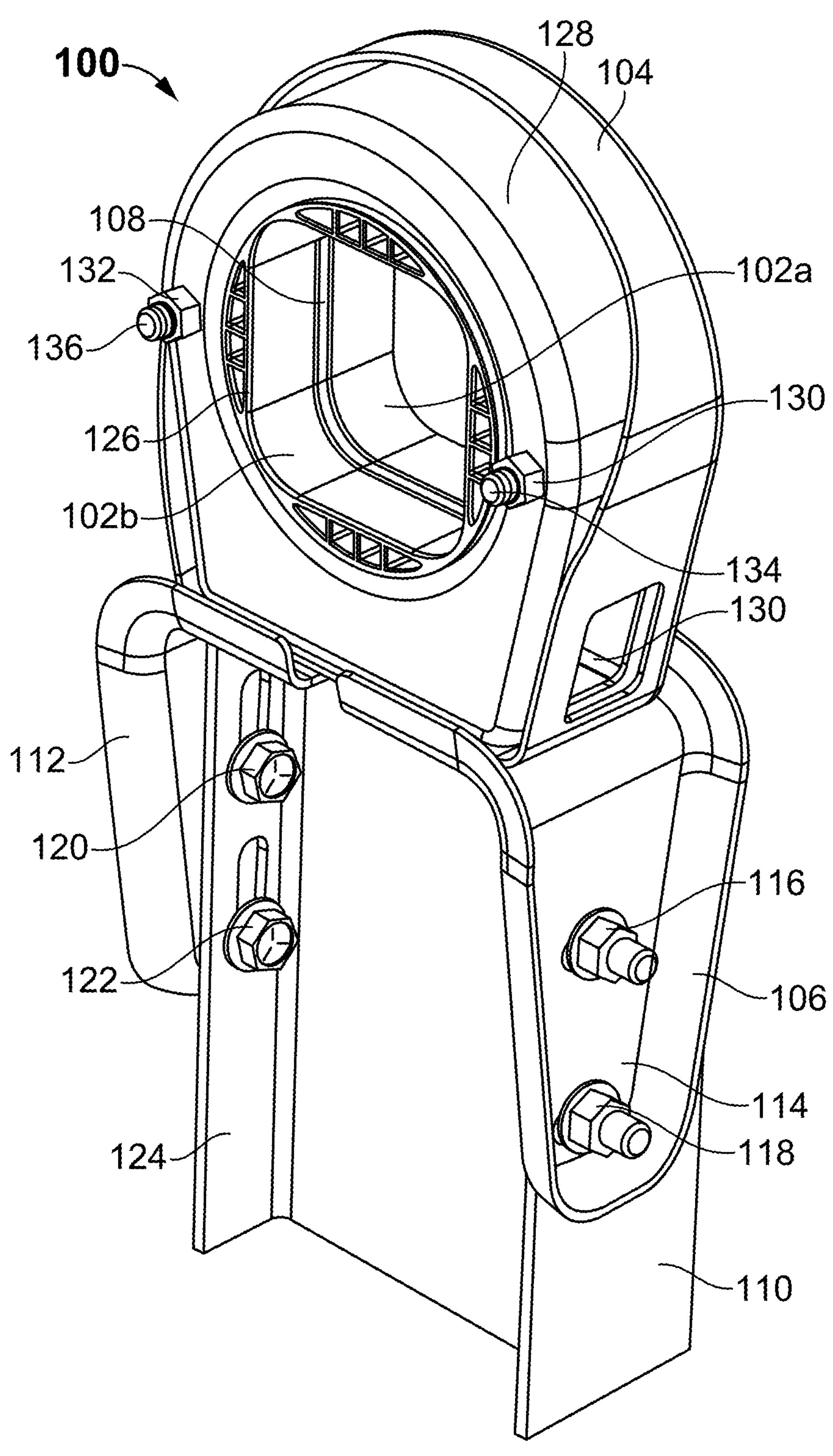
FIG. 1 illustrates a perspective view of a bearing assembly for a solar mounting rack in accordance with one embodiment.

Referring now to FIG. 1, a perspective view of a bearing assembly for a solar mounting rack or system in accordance with one embodiment is shown generally at reference numeral 100. The bearing assembly 100 comprises a bushing assembly which may comprise a back bushing 102*a* and front bushing 102*b*, a bushing housing which may comprise a back housing 104 and a front housing 128, which sandwich and front and back bushings 102*a* and 102*b* and a stop ring 108.

The bearing assembly 100 may be mounted to an upper end of a pile 110 using a riser bracket 106. The riser brackets 106 connects the bearing assembly 100 to the pile 110 at a top end. The bushing housing 104,128 together with additional elements discussed in FIGS. 2-8, retain the bushings 102*a* and 102*b*. The bushings 102*a* and 102*b* are circumferentially configured to accept a toque tube (shown in FIG. 4) and provide rotational movement to the torque tube via a motor and other elements to track the position of the sun or other light sources, as an example. More specifically, bushing 102*a* and 102*b* are configured to hold the toque tube 108 while the bushing housing 104, 128, is attached to the pile 110 via riser bracket 106. The pile 110 comprises apertures to allow for connectors such as nut and bold configurations 116, 118, 120 and 122 which are height adjustable via the apertures on the pile 110 and the riser bracket 106.

In embodiments, the bearing assembly 100 may be constructed of pre-galvanized steel but for the plastic bushings 102, but each element may also be formed of other materials.

The stop ring 108 provides an easily scalable hard stop via the stop ring 108 protrusion and coupler (or bolt) size, discussed in greater detail in relation to FIGS. 2-8. The bushings 102 are molded with the entire tube profile already spaced to slide on more easily to the torque tube.

Referring still to FIG. 1, the housing 104, 128 comprises a back housing 104, and a front housing 128, which are fastened together with other components of the assembly 100. Also, connectors or couplers, such as locks, nuts, and bolts 130, 132, 134, and 136 are provided and span at least a portion of the length of the assembly 100 internally using matching holes in each component.

Figure 2:
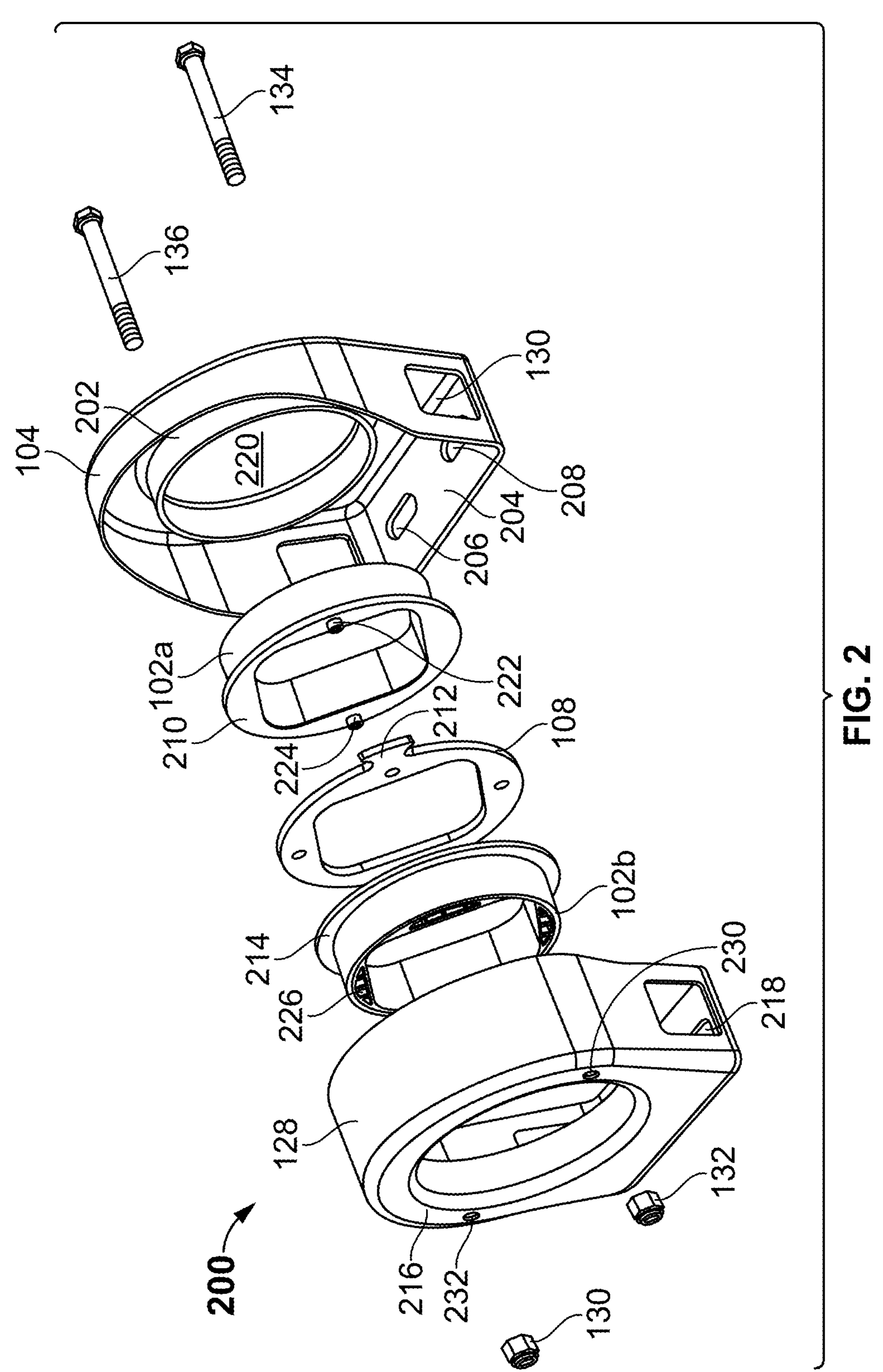
FIG. 2 illustrates an exploded view of a bearing assembly for a solar mounting rack in accordance with one embodiment.

Referring now to FIG. 2, an exploded view of a bearing assembly 100 for a solar mounting rack or tracker system in accordance with one embodiment is shown generally at reference numeral 200. Starting from the backside of the assembly, the bearing 100 comprises couplers which in this embodiment are bolts 134 and 136 which are configured to run through at least a portion of the assembly 100 lengthwise. Back housing 104 comprises a torque tube lip 202 and aperture 220 which is dimensioned and for the bushings 102*a* and 102*b* which in turn hold the torque tube. A lip 202 is configured to help the torque tube fit tightly in the apparatus and hold the torque tube tight. A first or back bushing 102*a* is shown and comprises a mating face to 210 and holes 222 and 224. The holes are configured to accept the couplers or bolts 134 and 136

With reference still to FIG. 2, the stop ring 108 comprises a plurality of holes 226 on its face configured to accept protrusions or studs of the bushings (shown in FIG. 5) and on at least one edge, at least one stud 212 projecting outwardly from the stop ring 108. The stop ring 108 together with its at least one stud 212, in operation, when the solar mounting system (shown in FIG. 5) goes to the safety stow position, ensures the bearing assembly 100 will not rotate past the specified or predetermined tilt angle (e.g., 60 degrees or 78 degrees) due to the stud 212 "hitting" or mating with the internal bolt 134, bolt 136 or both, because the at least one stud 212 will be stopped by the bolt body (discussed with relation to FIG. 3 and FIG. 4). In embodiments, the stud 212 is shaped with concavities on each side that matches the dimension of the couplers or bolts, so the stud and bolt fit together tightly. In other words, when the system is at full tilt-angle, the stud 108 reaches the bolt that is positioned at 60 degrees or a steeper 78 degrees for projects subject to hail, for example. (more vertical=less hail damage). However, the stop ring can be easily configured for any stow angle or a steeper. As a result, the torsion from the torque tube 108 is transferred through each bearing assembly and into each foundation along the tracker length (shown in FIG. 6), which allows for torque tube to be formed of less expensive material because it does not have to be as strong as when traditional systems and bearings are used.

Still with reference to FIG. 2, a second bushing 102*b* is provided and is shown and comprises a mating face to 214 and holes. The second bushing 102*b* comprises a face 226 that engages with the torque tube when slid on from the end of the torque tube. The face is molded to slide onto the torque tube end and the front and rear housings nest to provide overlapping mounting slots 206 and 208. The overlapping also provides additional rigidity to the assembly under high loading. In addition, the nesting housings as shown are simpler to fabricate.

The front housing 128 is configured to fit internally or nest within the back housing 104 and comprises coupler or bolt holes 230 and 232 for which the bolts are configured to slide through and hold the elements together. The nuts 130 and 132 are then connected to the bolts 134, 136 to secure the bearing assembly together.

Figure 3:
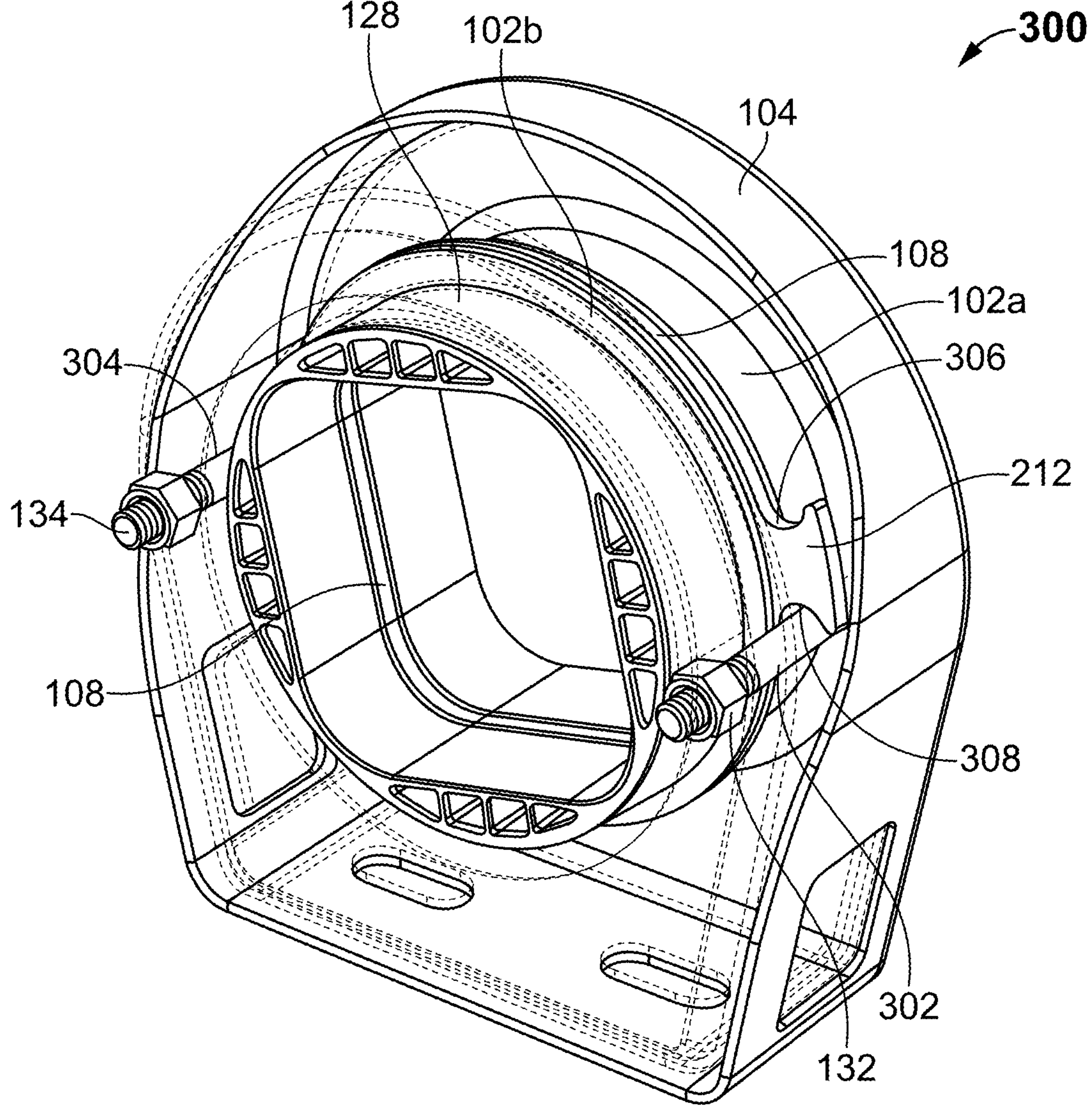
FIG. 3 illustrates a perspective transparent view of a bearing assembly for a solar mounting rack in accordance with one embodiment.

Referring now to FIG. 3 a perspective transparent view of a bearing assembly for a solar mounting rack is shown at reference numeral 300. The bearing assembly 100 comprises a bushing assembly 102, which may comprise back bushing 102*a* and front bushing 102*b*, and bushing housing 104, 128, which sandwiches a stop ring 108 and front and back bushings 102*a* and 102*b*.

As shown in FIG. 3, the stop ring 108 provides an easily scalable hard stop via the stop ring 108 and coupler or bolt body 302 and 304. In operation, the concave portions 304 and 306 of the stop ring 110 mates with the bolt body 302 and 304 when in the safety stow position, meaning the bearing assembly 100 will not rotate past the specified or predetermined tilt angle due to the stop ring 110 stud 212 with concavities 306 and 308, because the stud 212 will be stopped by either one of the bolt bodies. When the system is at full tilt-angle, the stud reaches the bolt that is positioned at 60 or 78 degrees in the bearing assembly 100 so it cannot rotate further, in examples. As a result, the torsion from the torque tube is transferred through each bearing assembly and into each foundation along the tracker length (shown in FIG. 6), which allows for torque tube to be formed of less expensive material because it does not have to be as strong as when traditional systems are used.

While the bolt (or coupler) as a circular dimension, the protrusion has a concave shape, other shapes such as square or rectangle may be used so long as the mating between the two pieces is sound. While only one stud 212 is shown on the stop ring, additional studs may be employed such as those shown in FIG. 5.

Figure 4:
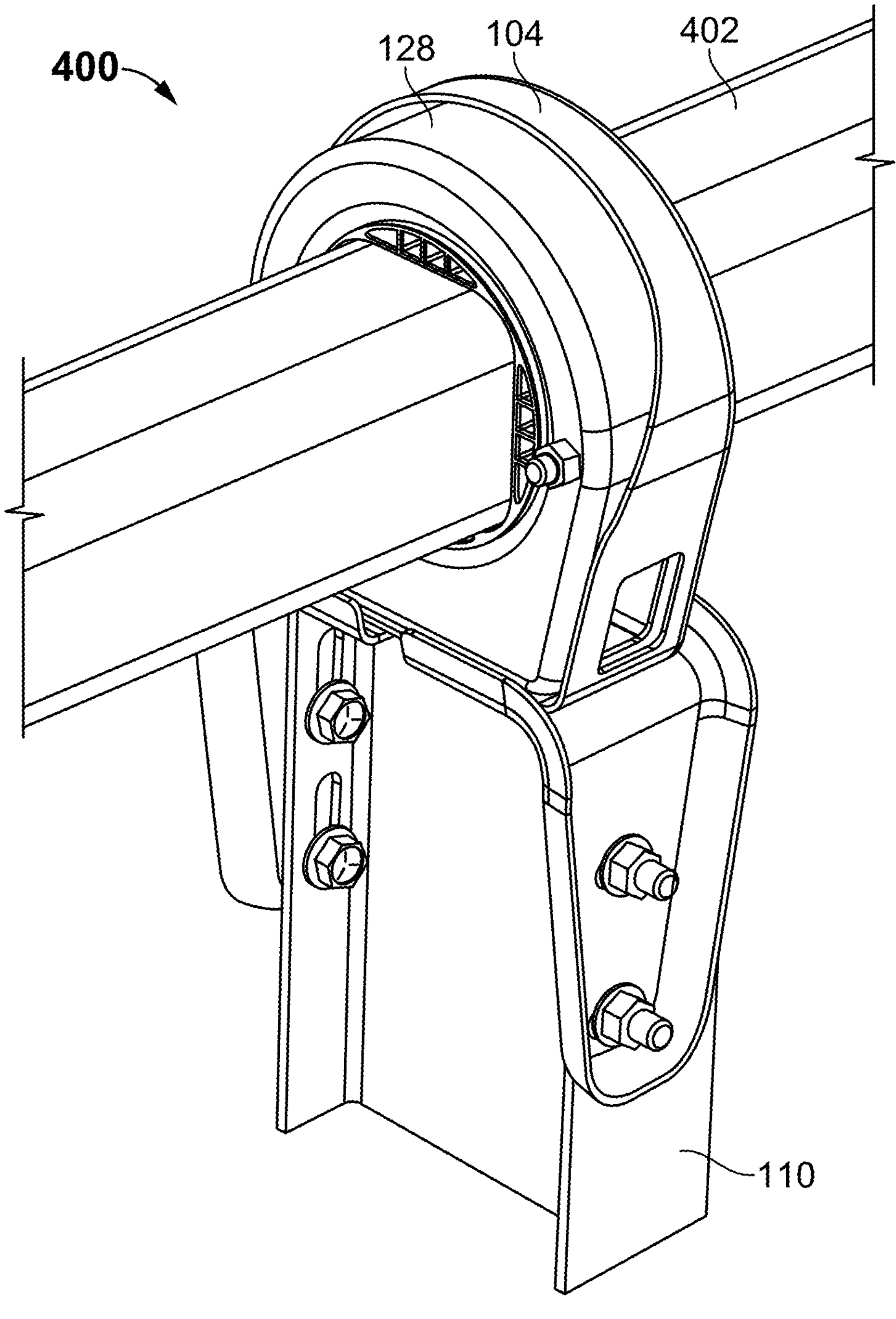
FIG. 4 illustrates the bearing assembly of FIGS. 1-3 with a torque tube positioned therein in accordance with one embodiment.

Referring now to FIG. 4 the bearing assembly of FIGS. 1-3 with a torque tube positioned therein is shown at reference numeral 400. As can be seen, the torque tube 402 is positioned in the bearing assembly 100 and fits between the bushings 102*a* and 102*b* with the stop ring (not shown) and bushing housing 104, 128. The bushings are molded with the entire tube profile already spaced and slides in tightly avoiding the need for a claim configuration.

Figure 5:
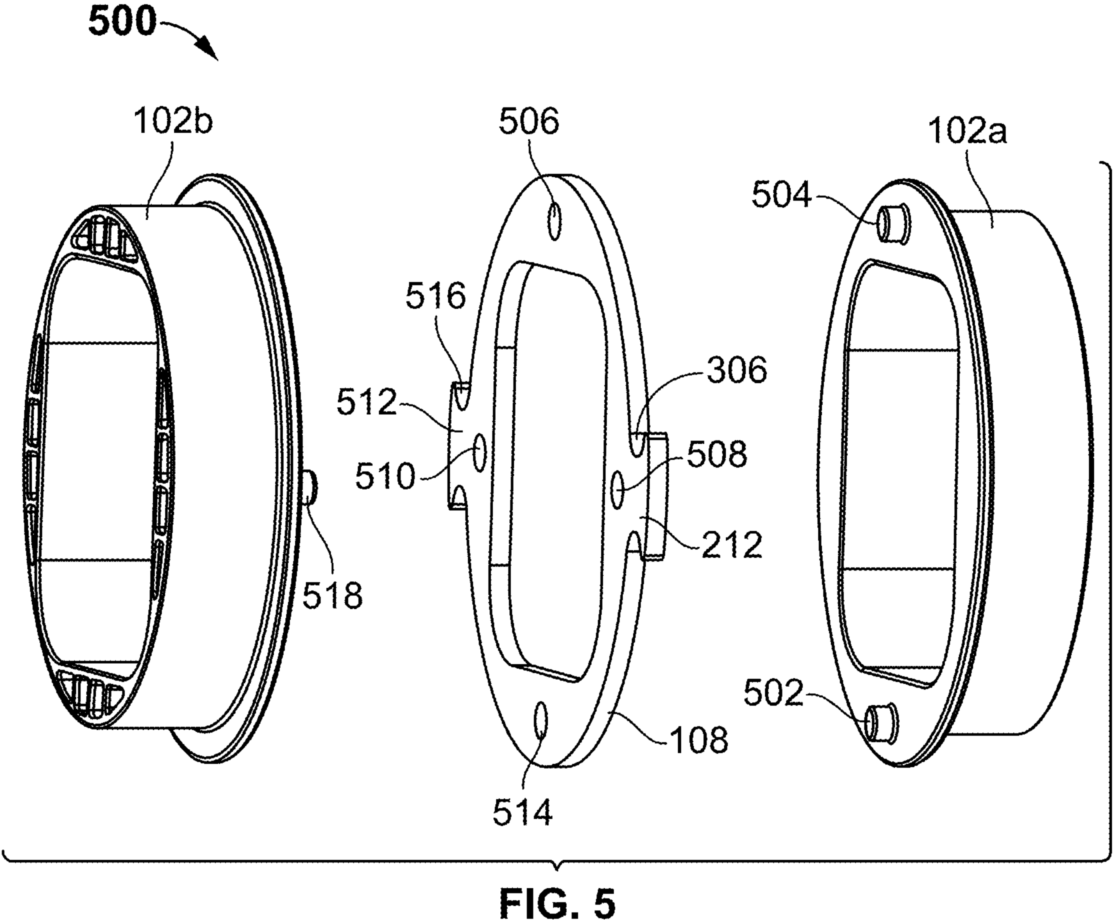
FIG. 5 illustrates another perspective explode view showing the bushings with the stop ring.

With reference now FIG. 5 illustrates another perspective explode view showing the bushings with the stop ring at reference numeral 500. The back bushing 102*a* comprises protrusions or studs 502 and 504 which are dimensioned to fit in the holes 506 and 514 of the stop ring 108. The front bushing 102*b* comprises protrusions 518 (and another left protrusion not shown) that is dimensioned to fit in the holes 508 and 510 of the stop ring 108. In other words, the holes 506 and 514 in the stop ring are configured to mate with the protruding studs in the rear face of the bushings. In embodiments, each bushing has two studs, and the stop ring has four holes. The front and rear bushings are installed perpendicular to each other to allow the studs to engage with the stop ring holes. These studs and holes serve the purpose of holding the stop ring in place prior to installation. Each of the protrusions (or studs) are fit via friction fit, but other types of fits are contemplated.

Figure 6:
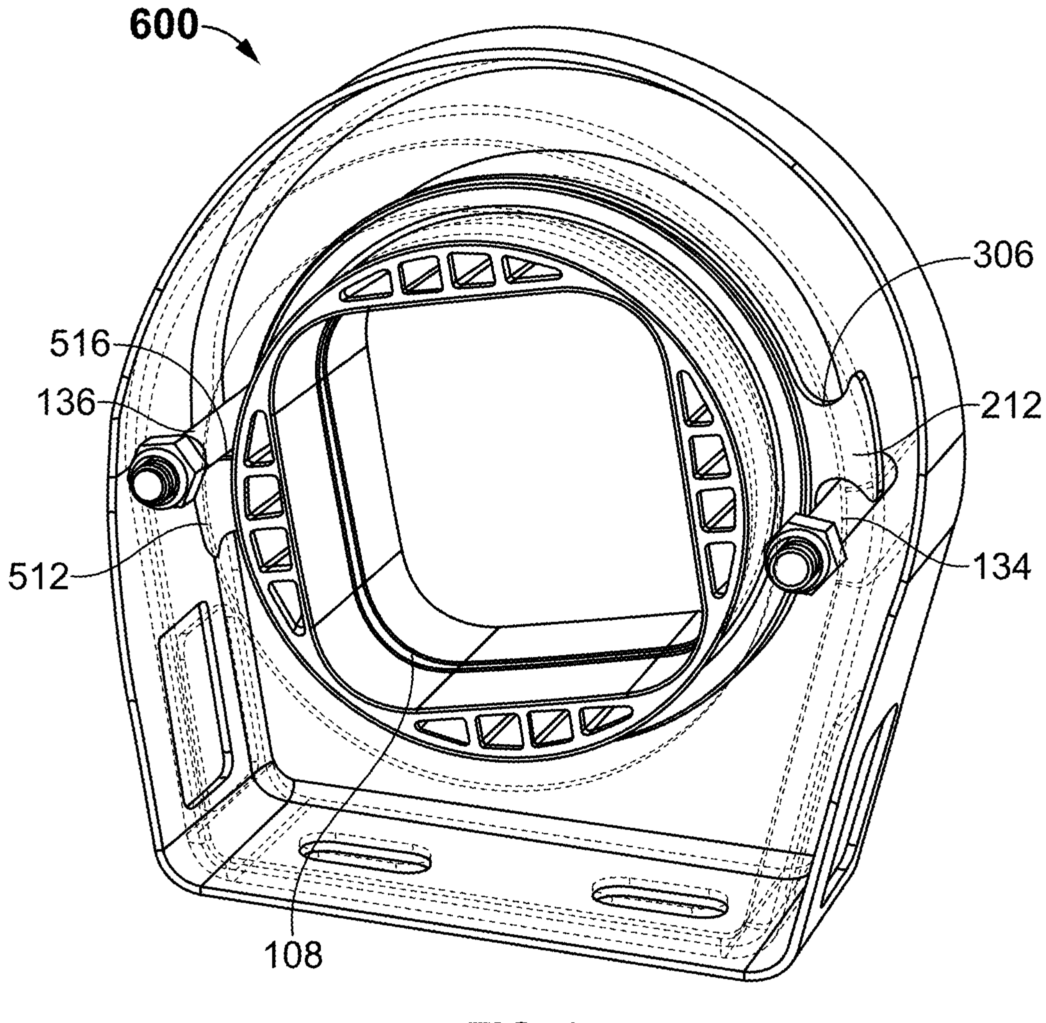
FIG. 6 illustrates a perspective front transparent view of a bearing assembly for a solar mounting rack in accordance with one embodiment.

With reference now to FIG. 6 a perspective front transparent view of a bearing assembly for a solar mounting rack in accordance with one embodiment is shown at 600. In this view, the second stud 512 can be seen in conjunction with the coupler 136, which provides a hard stop for each of the studs 212 and 512. In operation, the first stud 212 mates with a top portion of the bolt 134 and the second stud 512 mates with a bottom portion of the coupler 136. Upon rotation, the first stud 212 mates with a top portion of the bolt 136 and the second stud 512 mates with a bottom portion of the coupler 134.

Figure 7:
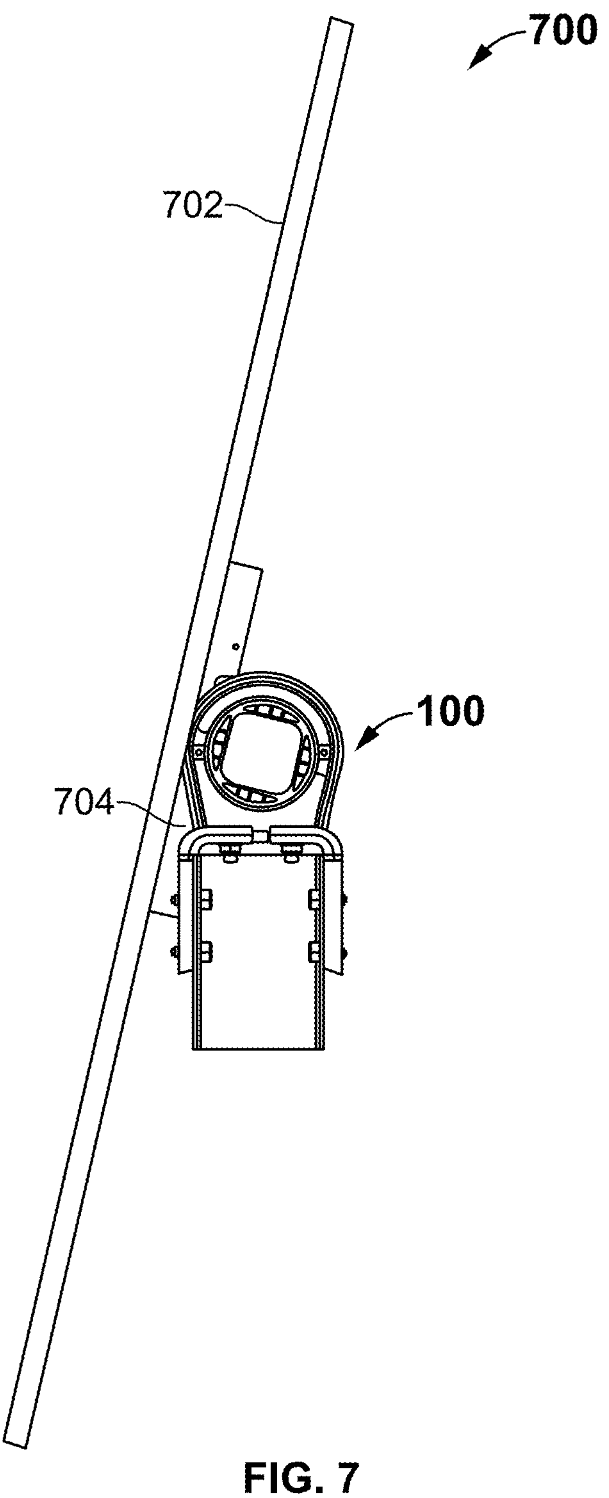
FIG. 7 shows the bearing assembly with solar tracker in a stowed position.

FIG. 7 shows the bearing assembly with solar tracker in a stowed position at 78 degrees for hail. As can be seen, the bearing 100 and attachment parts are interiorly situated to save space so that the panel can be stowed at a higher angle to avoid hail damage, while still being strong enough to survive high winds. As shown, the panel 702 can stow at this angle due to configuration 704 of the assembly and connecting parts not being in the way.

Figure 8:
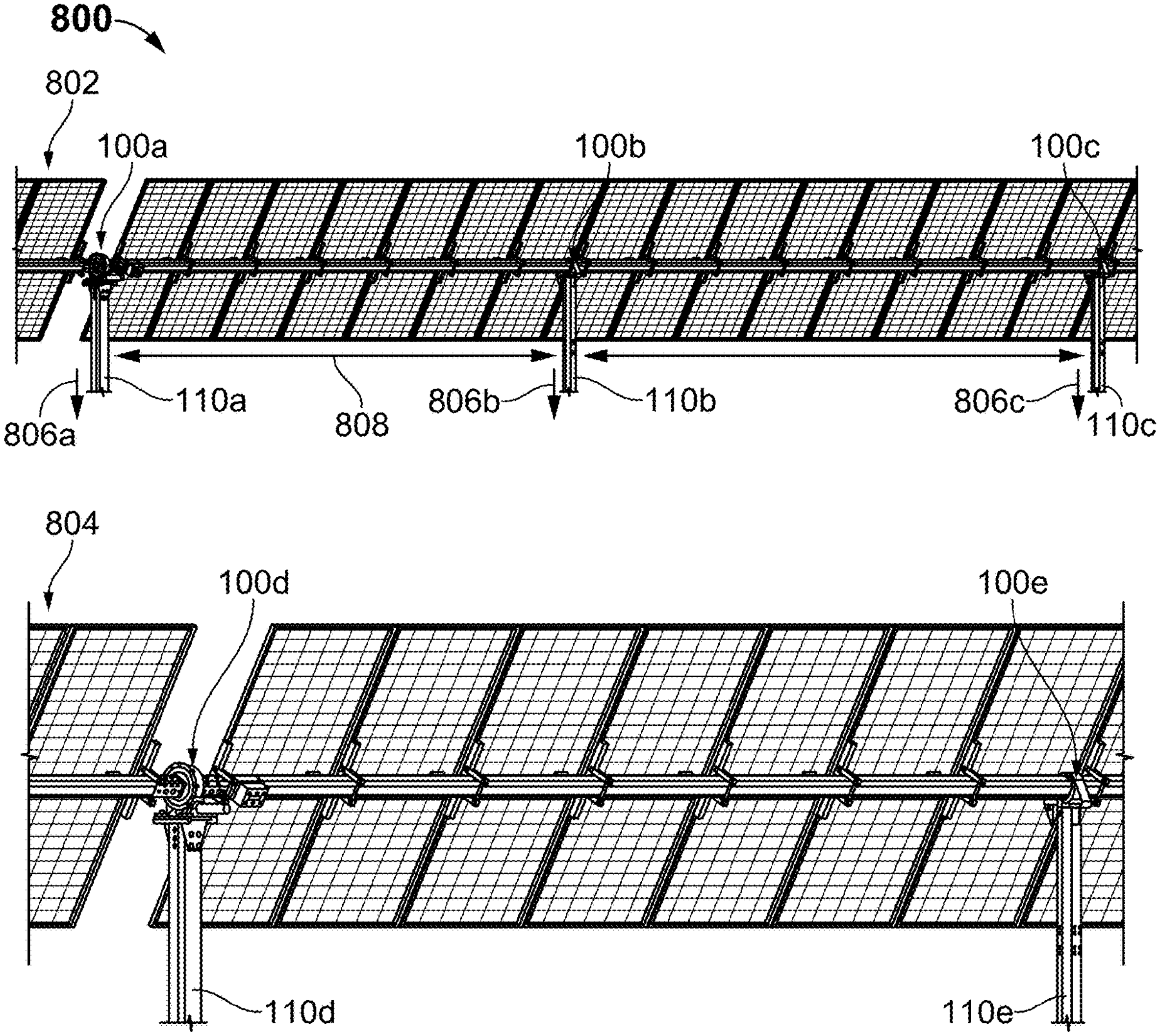
FIG. 8 illustrates a perspective view of a row of solar mounting tracker in accordance with one embodiment.

FIG. 8 illustrates a perspective view of a row of solar mounting tracker in accordance with one embodiment shown in their stowed position. The system 800 (or racking assembly) comprises one or more solar panels and bearing assemblies 100*a-e* for rotating and locking the panel in a stowed position. The system 800 comprises a mounting assembly which comprise one or more spatially disposed mounting piles or foundations each having torque tubes located therethrough. Because of the hard stops of the bearings, the distribution of torsional forces along the tracker allows for the torque tubes to be lighter, span farther from the central slew drive, and span farther between foundations. These benefits result in lower system costs and increased reliability. Further, this allows for a distribution of forces to the bearing housing and simplifies the assembly and could be developed with one or more studs.

Figure 9:
FIG. 9 a stepwise method for rotating a torque tube in a solar mounting rack in an accordance with one embodiment.

With reference now to FIG. 9 a stepwise method for rotating a torque tube in a solar mounting rack in accordance with one embodiment is shown at 900. Step 902 comprises, providing a bushing assembly configured to accept a torque tube, wherein the bushing comprises a front bushing, a back bushing, and wherein each of the front bushing and the back bushing is configured to accept a torque tube. The method further comprises providing a stop ring sandwiched between each of the front bushing and the back bushing, wherein the stop ring comprises a stud that has a protrusion thereon.

Step 904 comprises retaining the bushing assembly in a bushing housing. The bushing housing comprises at least one coupler that configured to extend through the length of the bearing assembly to connect the front and back bushings to the housing.

Step 906 comprises, during rotation of the bushings, stopping the rotation bushings using the stop ring stud which mates with the coupler thereby distributing a torsional force along the solar mounting system occurs.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

We claim:

1. A bearing for a solar mounting system, the bearing comprising:
- a bushing assembly configured to accept a torque tube, wherein the bushing comprises:
  - a front bushing;
  - a back bushing, wherein each of the front bushing and the back bushing is configured to accept a torque tube;
  - a stop ring sandwiched between each of the front bushing and the back bushing,
- wherein the stop ring comprises at least one a stud protruding therefrom;
- a bushing housing configured to retain the bushing assembly, wherein the bushing housing comprises at least one coupler configured to extend through at least a part of a length of the bearing to connect the front and back bushings to the housing, wherein during rotation of the bushings, the at least one stud of the stop ring is configured to mate with the coupler to halt a rotation of the front bushing and the back bushing to thereby distribute a torsional force along the solar mounting system.

2. The bearing of claim 1, wherein the stop ring comprises at least one protrusion, wherein the protrusion has at least on concave face, wherein the concave face is configured to mate with the coupler, and wherein the coupler is a bolt having a round dimension and a thread to connect to a nut thereto.

3. The bearing of claim 1, wherein the bearing is coupled to a riser bracket, wherein the riser bracket is connectable to the bearing assembly toward a bottom of the bearing assembly, and wherein the riser bracket is further connectable toward a top end of a pile.

4. The bearing of claim 1, wherein the first bushing and the second bushing are molded with a torque tube profile space therein.

5. The bearing of claim 1, wherein the bushing housing comprises:
- a back housing configured to accept the first bushing;
- a front housing configured to accept the second bushing;
- wherein the back housing has a larger dimension than the front housing such that the front housing nests within the back housing with a gap therebetween.

6. The bearing of claim 5, wherein the back housing comprises apertures dimensioned for the coupler, and further comprises a torque tube lip configured to retain the torque tube and provide a mating face for the back bushing.

7. The bearing of claim 1, wherein the first bushing comprises:
- a mating face and holes configured to accept the coupler and mate with the stop ring; at least one protrusion that is dimensioned to fit in holes of the stop ring.

8. The bearing of claim 1, wherein the stop ring comprises a plurality of holes on its face, wherein the holes are configured to accept the coupler.

9. The bearing of claim 1, wherein when the solar tracker system is at full tilt angle, the stud reaches the coupler and is stopped at 60 or 78 degrees.

10. The bearing of claim 1, wherein the second bushing comprises a mating face and holes configured to accept the coupler and mate with the stop ring and the second housing.

11. A method for controlling rotation of a toque tube for a solar mounting system, the method comprising:
- providing a bushing assembly configured to accept a torque tube, wherein the bushing comprises:
- a front bushing;
- a back bushing, wherein each of the front bushing and the back bushing is configured to accept a torque tube;
- a stop ring sandwiched between each of the front bushing and the back bushing, wherein the stop ring comprises at least one a stud protruding therefrom;
- a bushing housing configured to retain the bushing assembly, wherein the bushing housing comprises at least one coupler configured to extend through at least a part of a length of the bearing to connect the front and back bushings to the housing,
- during rotation of the bushings, stopping the rotation bushings using the stop ring stud to mate with the coupler to distribute a torsional force along the solar mounting system.

12. The method of claim 11, wherein the stop ring comprises at least one protrusion, wherein the protrusion has at least on concave face, wherein the concave face is configured to mate with the coupler, and wherein the coupler is a bolt having a round dimension and a thread to connect to a nut thereto.

13. The method of claim 11, wherein the bearing is coupled to a riser bracket, wherein the riser bracket is connectable to the bearing assembly toward a bottom of the bearing assembly, and wherein the riser bracket is further connectable toward a top end of a pile.

14. The method of claim 11, wherein the first bushing and the second bushing are molded with a torque tube profile space therein.

15. The method of claim 11, wherein the bushing housing comprises:

a back housing configured to accept the first bushing;

a front housing configured to accept the second bushing;

wherein the back housing has a larger dimension than the front housing such that the front housing nests within the back housing with a gap therebetween.

16. The method of claim 15, wherein the back housing comprises apertures dimensioned for the coupler, and further comprises a torque tube lip configured to retain the torque tube and provide a mating face for the back bushing.

17. The method of claim 11, wherein the first bushing comprises:

a mating face and holes configured to accept the coupler and mate with the stop ring; at least one protrusion that is dimensioned to fit in holes of the stop ring.

18. The method of claim 11, wherein the stop ring comprises a plurality of holes on its face, wherein the holes are configured to accept the coupler.

19. The method of claim 11, wherein when the solar tracker system is at full tilt angle, the stud reaches the coupler and is stopped at 60 or 78 degrees.

20. The method of claim 11, wherein the second bushing comprises a mating face and holes configured to accept the coupler and mate with the stop ring and the second housing.

* * * * *